United States Patent [19]
Jufa et al.

[11] 3,821,181
[45] June 28, 1974

[54] PROCESS FOR PRODUCING LINEAR POLYMERS OF ALICYCLIC COMPOUNDS

[76] Inventors: Tatyana Lvovna Jufa, ulitsa Mayakovskogo, 3, kv. 23; Irina Alexandrovna Poletaeva, ulitsa 111 Internatsionala, 74, kv. 212; Vitaly Abramovich Kormer, ulitsa Zheleznovodskaya, 62, kv. 2; Boris Davydovich Babitsky, ulitsa Krasnogo Kursanta, 7, kv. 9; Mark Iosifovich Lobach, Annikov prospekt, 28, kv. 52; Viktoria Vladimirovna Markova, 2 Murinsky prospekt, 44, kv. 88; Lidia Alexandrovna Churlyaeva, ulitsa Avtovskaya, 2, kv. 147, all of, Leningrad, U.S.S.R.

[22] Filed: July 12, 1971

[21] Appl. No.: 162,020

[30] Foreign Application Priority Data
Aug. 13, 1970 U.S.S.R............................ 1452124

[52] U.S. Cl.... 260/91.5, 260/33.6 UA, 260/47 UA, 260/67 UA, 260/88.7 A, 260/91.1 R, 260/93.1, 260/93.5 R

[51] Int. Cl. .............................................. C08f 1/30
[58] Field of Search... 260/93.1, 93.5, 47 U, 67 UA, 260/88.7 A, 91.1 R, 91.5, 47 UA

[56] References Cited
UNITED STATES PATENTS

| | | | |
|---|---|---|---|
| 3,379,706 | 4/1963 | Wilke.................................. | 260/943 |
| 3,436,383 | 4/1969 | O'Brien et al. ..................... | 260/88.7 |
| 3,597,403 | 8/1971 | Ofstead.............................. | 260/88.2 |
| 3,640,986 | 2/1972 | Burleigh et al. ................... | 260/93.1 |

*Primary Examiner*—Stanford M. Levin
*Attorney, Agent, or Firm*—Holman & Stern

[57] ABSTRACT

A process for producing linear polymers of alicyclic compounds comprising at least two double bonds by polymerizing them in the presence of a catalyst comprising π-complexes of metals of group VI of the periodic system, as well as in the presence of compounds of said π-complexes with acceptors of organic and acidoligands. Polymerization is carried out in the mass of a monomer or in a solution of hydrocarbons, halogen derivatives thereof or ethers.

These catalysts enable the production of polymers with a high yield and at a good rate.

8 Claims, No Drawings

PROCESS FOR PRODUCING LINEAR POLYMERS OF ALICYCLIC COMPOUNDS

The present invention relates to processes for producing linear polymers of alicyclic compounds comprising at least two double bonds.

These polymers may be used as general-purpose rubbers in tire and vulcanized rubber production since they simulate alternating co-polymers of various olefins and dienes, the vulcanizates of said co-polymers having high physical characteristics and elasticity.

Known in the art is a process for producing polymers of alicyclic compounds comprising at least two double bonds, consisting in polymerizing said compounds with a ring opening in a solution or bulk in the presence of catalysts, comprising salts of chromium, molybdenum, tungsten and organo-metallic compounds of Ia, II and IIIa groups of the periodic system.

The disadvantage of the prior art processes resides in the fact that the catalysts used are not sufficiently effective and stereospecific. Polymerization reactions which take place under the influence of these catalytic systems have substantial induction period in the presence of a solvent and are accompanied by gelling. For this reason this process is scarcely suitable for commercial use.

It is an object of the present invention to provide a novel catalyst for a process of producing linear polymers of alicyclic compounds.

In accordance with the above and other objects of the invention the catalyst comprises π-complexes of metals of the group VI of the periodic system, as well as combinations of said complexes and acceptors of organic or acidoligands.

The most effective are catalysts comprising π-allyl complexes of the general formula

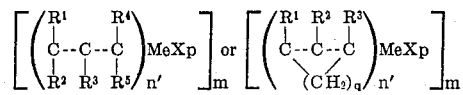

wherein M represents Cr, Mo, W;

$R^1$, $R^2$, $R^3$, $R^4$, $R^5$ are hydrogen, alkyl, cycloalkyl, aryl, halogen;

X represents a monovalent anion selected from the group consisting of $Cl^-$, $Br^-$, $I^-$, $CNS^-$, $OH^-$, $OAlk^-$, $CH_3COO^-$, $CCl_3COO^-$, $CF_3COO^-$, $N(Alk)_2$, $C_6H_5OSO_2^-$; and $n' = 1-4$; $m = 1-2$; $p = 0-3$; $q = 1-9$.

These catalysts enable the production of polymers of alicyclic compounds with the highest yields.

It is also advantageous to use π-complexes of the general formula,

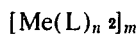

wherein Me represents Cr, Mo, W;

L represents a ligand selected from the group consisting of CO, $C_5H_5$, $C_7H_8$, $C_6H_6$, $C_8H_8$, $PCl_3$, $PR_3$, $P(OR)_3$;

R represents an organic radical; and $n^2 = 2-6$; $m = 1-2$.

π-complexes such as cyclopentadienylcarbonyl, cyclooctadienecarbonyl, cycloheptatrienecarbonyl, arenecarbonyl, cyclooctatetraenecarbonyl, norbornenecarbonyl, cyclododecatrienecarbonyl, trichlorphosphinecarbonyl, triphenylphosphinecarbonyl, triphenylphosphitecarbonyl, cyclopentadienecyclooctadiene, arenecyclopentadiene, cyclopentadienylcycloheptatriene, norbornenecyclopentadiene, cyclooctatetraencyclopentadiene, cyclopentadienylcyclododecatriene, trichlorophosphinecyclopentadienyl, triphenylphosphitecyclopentadienyl, arenecyclooctadiene, cycloheptatrienecyclooctadiene, norborenecyclooctadiene, cyclooctatetraenecyclooctadiene, trichlorphosphinecyclooctadiene, triphenylphosphinecyclooctadiene, triphenylphosphitecyclooctadiene, arenecyclododecatriene, arenecycloheptatriene, arenenorbornene, arenecyclooctatetraene, arenetrichlorophosphine, arenetriphenylphosphite, trichlorphosphinecyclododecatriene, trichlorophosphinebornene, trichlorphosphinecycloheptatriene, trichlorophosphinecyclododecatriene, triphenylphosphinecyclododecatriene, triphenylphosphinecyclododecatriene, triphenylphosphinenorbornene, triphenylphosphinecycloheptatriene, triphenylphosphitenorbornene, triphenylphosphitecycloheptatriene complexes of metals of the group VI may be used.

As acceptors of organic and acidoligands compounds of the general formula, MZn, wherein M represents metals of groups III–VIII of the periodic system; Z represents a halogen atom, alkyl, aryl, as well as combinations thereof; and $n = 2-6$ may be used.

As monomers substituted and unsubstituted alicyclic compounds comprising at least two double bonds are used.

Substitutes for hydrogen in the ring may comprise alkyl-, aryl-, aralkyl-, alkaryl-, acyl-, alkoxy-, cyano-, carbalkoxy-, aryloxy-, acyloxy-, aroyloxy-groups and halogen atoms. The ring of the alicyclic compound may comprise one or several such groups and atoms.

Polymerization of alicyclic compounds in the presence of the above-mentioned catalysts may be performed in hydrocarbons, halohydrocarbons and ethers.

The present process for producing linear polymers of alicyclic compounds is carried out as follows:

An alicyclic compound is polymerized for 0.1–20 hours in the presence of small quantities of the above-mentioned catalyst at a temperature of from −50°C to +80°C. Polymerization may take place both in the above-mentioned solvents and without them, that is, in the bulk of the monomer. The catalyst may be prepared either in the presence or absence of a monomer.

The molar ratio between an acceptor of organic and acidoligands and a π-complex is selected within the range of from 0.5 to 10:1, and preferably of from 2:1 to 6:1.

The molar ratio between a monomer and a π-complex may be selected within the range of from 50:1 to 10,000:1, and preferably of from 300:1 to 3,000:1.

The polymer which is thus produced is isolated from the solution by any conventional method, such as by adding alcohol or evaporating the solvent.

The isolated polymer is used in preparation of rubber mixtures and vulcanizates.

The invention permits the polymerization of alicyclic compounds comprising at least two double bonds with a ring opening more efficiently than with prior art catalysts. Polymerization of the above-said alicyclic compounds in the presence of the catalysts according to the present invention is performed at good rates even utilizing small quantities of the catalyst. Polymerization takes place without gelling and is commercial quite useful.

The present invention will be better understood from the following illustrative examples of producing linear polymers of alicyclic compounds.

Example 1

Benzene solutions of aluminium bromide ($2.10^{-4}$ mole) and tetra($\pi$-crotyl)tungsten ($1.10^{-4}$ mole) were poured into a 100 ml glass ampoule. Then 8.9 g of trans, trans, cis-cyclododecatriene-1,5,9 were added. Polymerization was performed at 30°C over 5 hours. The polymer yield was of 8.1 g (91% of the theoretical amount). The polymer contained 60% of trans- and 40% of cis-double bonds. Intrinsic viscosity of the polymer ($\eta$) = 1.54 dl/g (in benzene at 25°C).

Example 2

Benzene solutions of gallium bromide ($6.10^{-4}$ mole) and tungsten hexacarbonyl ($3.10^{-4}$ mole) were poured into a 100 ml glass ampoule. Then 13.2 g of cyclooctadiene were added. Polymerization was performed at 30°C over 10 hours. The polymer yield was of 5.9 g (45% of the theoretical amount). The polymer contained 40% of cis- and 60% of trans-double bonds. Intrinsic viscosity of the polymer ($\eta$) = 2.25 dl/g (in benzene at 25°C).

Example 3

Benzene solutions of ethylaluminium dichloride ($8.10^{-4}$ mole) and tetra($\pi$-allyl)molybdenum ($4.10^{-4}$ mole) were poured into a 100 ml glass ampoule. Then 15.2 g of 1-chlorcyclooctadiene-1,5 was added. Polymerization was performed at 30°C over 16 hours. The polymer yield was of 9.1 g (60% of the theoretical amount). The polymer contained 30% of trans- and 70% of cis-double bonds. Intrinsic viscosity of the polymer ($\eta$) = 1.65 dl/g (in benzene at 25°C).

Example 4

Benzene solutions of tetrabutyltin ($8.10^{-4}$ mole) and tris($\pi$-crotyl)tungsten chloride ($4.10^{-4}$ mole) were poured into a 100 ml ampoule. Then 12.2 g of 1-methylcyclooctadiene-1,5 was added. Polymerization was performed at 30°C over 6 hours. The polymer yield was of 11.6 g (95% of theoretical amount). The polymer contained 40% of trans- and 60% of cis-double bonds. Intrinsic viscosity of the polymer ($\eta$) = 0.63 dl/g (in benzene at 25°C).

Example 5

Benzene solutions of tris($\pi$-ally)tungsten trifluoroacetate ($1.10^{-4}$ mole) and 8.9 g of trans, trans, ciscyclododecatriene-1,5,9 were poured into a 100 ml glass ampoule. Polymerization was performed at 30°C over 20 hours. The polymer yield was of 2.7 g (30% of the theoretical amount). The polymer contained 55% of trans- and of cis-double bonds. Intrinsic viscosity of the polymer ($\eta$) = 1.20 dl/g (in benzene at 25°C).

Example 6

Solutions of tungsten hexachloride ($8.10^{-4}$ mole) and tris($\pi$-allyl)tungsten iodide ($2.10^{-4}$ mole) in hexane were poured into a 100 ml glass ampoule. Then 22.7 g of 5-phenycycloundecadiene-1,6 were added. Polymerization was performed at 30°C during 3 hours. The polymer yield was of 17 g (75% of the theoretical amount). The polymer contained 40% of trans- and 35% of cis-double bonds. Intrinsic viscosity of the polymer ($\eta$) = 1.6 dl/g (in benzene at 25°C).

Example 7

Solutions of diethyl aluminium chloride ($6.10^{-4}$ mole) and benzene molybdentricarbonyl ($2.10^{-4}$ mole) in diethyl ether were poured into a 100 ml glass ampoule. The 11 g of cyclooctadiene-1,5 was added. Polymerization was performed at 20°C during 10 hours. The polymer yield was of 2.8 g (25 of the theoretical amount). The polymer contained 45% of trans- and 55% of cis-double bonds. Intrinsic viscosity of the polymer ($\eta$) = 2.2 dl/g (in benzene at 25°C).

Example 8

Solutions of aluminium bromide ($4.10^{-4}$ mole) and tris($\pi$-allyl)methoxytungsten ($2.10^{-4}$ mole) in chlorobenzene were poured into a 100 ml glass ampoule. Then 16 g of trans-, trans-, cis-cyclododecatriene-1,5,9 were added. Polymerization was performed at 0°C over 1 hour. The polymer yield was of 14.2 g (89% of the theoretical amount). The polymer contained 60% of trans- and 40% of cis-double bonds. Intrinsic viscosity of the polymer ($\eta$) = 1.70 dl/g (in benzene at 25°C).

Thus, referring to the above examples, polymerization of alicyclic compounds comprising at least two double bonds in the presence of $\pi$-complexes of metals of group VI of the periodic system and combinations thereof with acceptors of organic and acidoligands takes place at a good rate and requires small catalyst consumption. As distinguished from the processes carried out in the presence of prior art catalysts of the Ziegler-Nutt type, the catalysts according to the present invention, being characterized by substantially higher efficiency and stereospecificity, enable polymerization in the presence of a solvent without an induction period. Polymerization is not accompanied by gelling. These considerations show that the process according to the invention is more suitable for the development of a commercial-scale process.

What is claimed is:

1. A process for producing linear polymers of unsaturated alicyclic compounds containing from 8 to 12 carbon atoms in the cyclic ring and containing from 2 to 3 unconjugated double bonds in the cyclic ring, comprising polymerizing one of said compounds at a temperature within the range of from about −50°C to about +80°C in the presence of a catalyst selected from the group consisting of $\pi$-complexes of the general formula

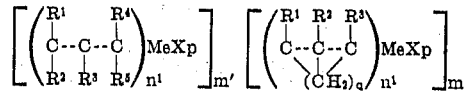

and [Me (L)n$^2$]m and combinations of said $\pi$-complexes with acceptors of organic and acidoligands,
wherein Me represents a metal selected from the group consisting of Cr, Mo and W;
$R^1, R^2, R^3, R^4, R^5$ are selected from the group consisting of hydrogen, alkyl, cycloalkyl, aryl and halogen;
X represents a monovalent anion selected from the group consisting of Cl$^-$, Br$^-$, I$^-$, CNS$^-$, OH$^-$, OAlk$^-$, CH$_3$COO$^-$, CCl$_3$COO$^-$, CF$_3$COO$^-$, N(Alk)$_2^-$ and C$_6$H$_5$OSO$_2^-$;
L represents a ligand selected from the group consisting of CO, C$_5$H$_5$, C$_7$H$_8$, C$_6$H$_6$, C$_8$H$_8$, PCl$_3$, PR$_3$, P(OR)$_3$ and combinations thereof;
R represents an organic radical;
$n^1 = 1$–4; $n^2 = 2$–6; $m = 1$–2; $p = 0$–3; and $q = 1$–9;
the molar ratio between said alicyclic compound and said π-complex being within the range of from 50:1 to 10,000:1, and the molar ratio between said acceptor of organic and acidoligands and said π-complex in said combinations thereof being within the range of from 0.5:1 to 10:1.

2. A process according to claim 1, wherein said alicyclic compounds have substituted for hydrogen atoms in the ring substituents selected from the group consisting of alkyl-, aryl-, arylkyl-, alkaryl-, acyl-, alkoxy-, cyano-, carbalkoxy-, aryloxy-, acyloxy-, aroyloxy- groups and halogen.

3. A process according to claim 1 wherein said π-complexes comprise π-allyl compounds of the general formula

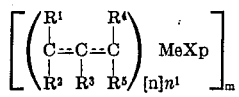

and

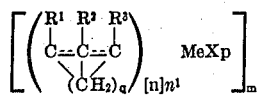

wherein Me represents a metal selected from the group consisting of Cr, Mo and W;

$R^1$, $R^2$, $R^3$, $R^4$, $R^5$ are selected from the group consisting of hydrogen, alkyl, cycloalkyl, aryl and halogen;

X represents a monovalent anion selected from the group consisting of $Cl^-$, $Br^-$, $I^-$, $CNS^-$, $OH^-$, $OAlk^-$, $CH_3COO^-$, $CCl_3COO^-$, $CF_3COO^-$, N(Alk)$_2^-$ and $C_6H_5OSO_2^-$; and $n^1 = 1-4$; $M = 1-2$; $p = 0-3$; and $q = 1-9$.

4. A process according to claim 1 wherein said π-complexes comprise π-complexes of the general formula $[(Me(L)_{[n]n^2}]_m$ 

wherein Me represents a metal selected from the group consisting of Cr, Mo and W;

L represents a ligand selected from the group consisting of CO, $C_5H_5$, $C_7H_8$, $C_6H_6$, $C_8H_8$, $PCl_3$, $PR_3$, $P(OR)_3$ and combinations thereof;

$n^2 = 2-6$; and $m = 1-2$; and

R represents an organic radical.

5. A process according to claim 1, wherein said acceptors of organic and acidoligands comprise compounds of the general formula, MZn, wherein M represents a metal of groups III–VIII of the periodic system; Z is selected from the group consisting of halogen atoms, alkyl, aryl, and combinations thereof; and $n = 2-6$.

6. A process according to claim 1, wherein the molar ratio between an acceptor of organic and acidoligands and a π-complex is within the range of from 2:1 to 6:1.

7. A process according to claim 1, wherein the molar ratio between an alicyclic compound and a π-complex is within the range of from 300:1 to 3,000:1.

8. A process according to claim 1 wherein polymerization is carried out in the bulk of a monomer or in a solvent selected from the group consisting of aromatic, aliphatic, alicyclic hydrocarbons, halogen derivatives thereof and ethers.

* * * * *

UNITED STATES PATENT OFFICE
CERTIFICATE OF CORRECTION

PATENT NO. : 3,821,131
DATED : June 28, 1974
INVENTOR(S) : TATYANA L. JUFA, ET AL It is certified that error appears in the above-identified patent and that said Letters Patent are hereby corrected as shown below:

Column 1, line 40,

" 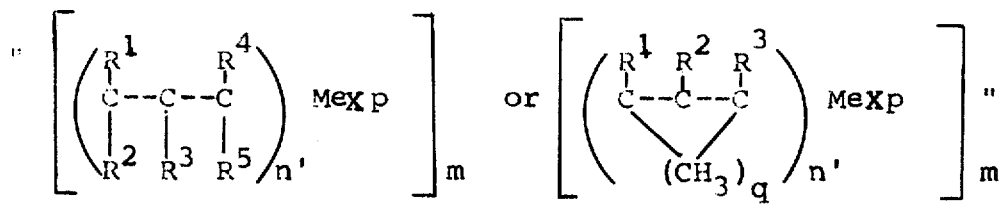 "

should read

-- 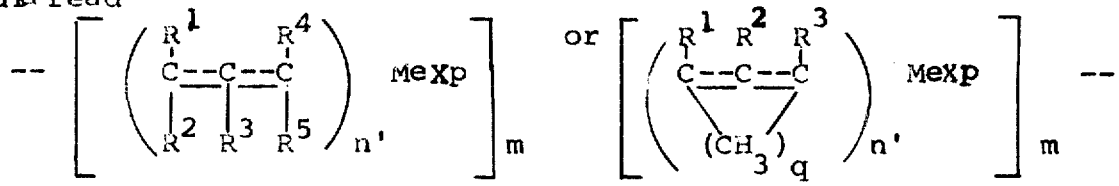 --

Column 1, line 49, "N(Alk)$_2$" should read --N(Alk)$_2^-$--

Column 1, line 63, "cyclopentadienylcarbonyl" should read --cyclopentadienecarbonyl--

Column 2, line 3, "cyclopentadienylcy-" should read --cyclopentadienecy- --

Column 2, line 4, "cyclopentadienylcy-" should read --cyclopentadienecy- --

Column 2, line 5, "trichlorophosphinecyclopentadienyl" should read --trichlorophosphinecyclopentadiene--

Colum 2, line 6, "triphenylphosphitecyclopentadienyl" should read --triphenylphosphitecyclopentadiene--

Column 2, line 14, "trichlorophosphenebor-" should read --trichlorophosphenenorbor- --

UNITED STATES PATENT OFFICE
CERTIFICATE OF CORRECTION

PATENT NO. : 3,821,181
DATED : June 23, 1974
INVENTOR(S) : TATYANA L. JUFA, ET AL It is certified that error appears in the above-identified patent and that said Letters Patent are hereby corrected as shown below:

Column 2, line 17, cancel "triphenylphosphinecyclododeca-"
Column 2, line 18, cancel "triene"
Column 4, line 4, "25" should read --25%-- column 4, line 47,
"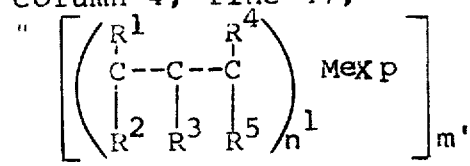 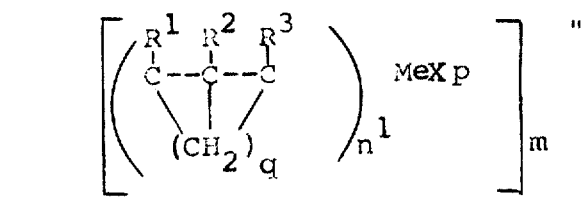"
should read
--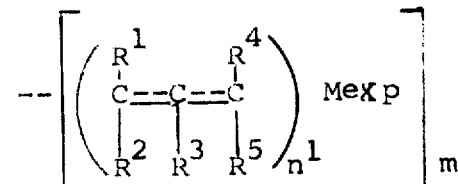 or 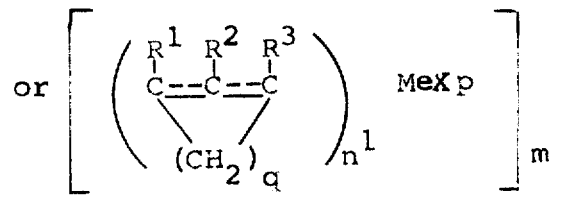--

Column 5, line 9, "arylkyl-" should read --aralkyl- --
Column 5, line 17,

"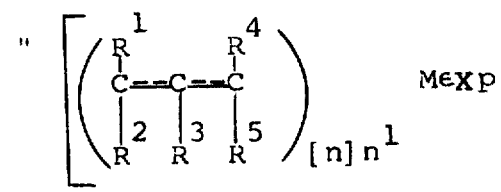" should read --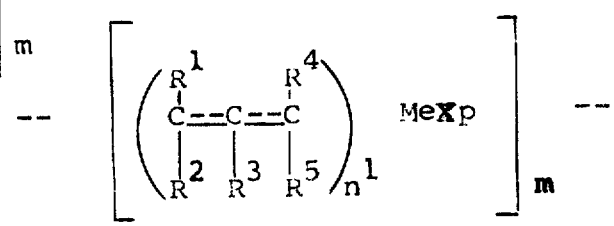--

UNITED STATES PATENT OFFICE
CERTIFICATE OF CORRECTION

PATENT NO. : 3,821,181
DATED : June 28, 1974
INVENTOR(S) : TATYANA L. JUFA, ET AL It is certified that error appears in the above—identified patent and that said Letters Patent are hereby corrected as shown below:

Column 5, line 23, " 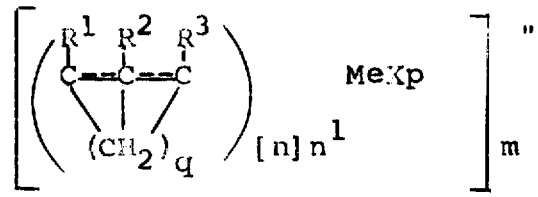 " should read -- 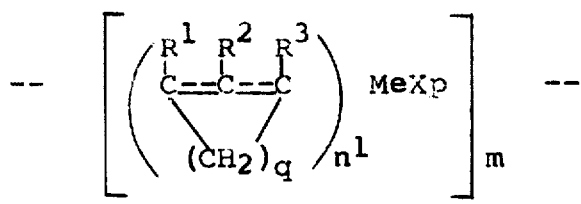 --

Signed and sealed this 1st day of July 1975.

(SEAL)
Attest:

RUTH C. MASON
Attesting Officer

C. MARSHALL DANN
Commissioner of Patents
and Trademarks